United States Patent [19]

Vanderhoeven

[11] Patent Number: 4,643,376
[45] Date of Patent: Feb. 17, 1987

[54] SHOCK INDUCING POD FOR CAUSING FLOW SEPARATION

[75] Inventor: Antonius J. Vanderhoeven, Bellevue, Wash.

[73] Assignee: The Boeing Company, Seattle, Wash.

[21] Appl. No.: 695,759

[22] PCT Filed: Sep. 30, 1982

[86] PCT No.: PCT/US82/01378
§ 371 Date: Sep. 30, 1982
§ 102(e) Date: Sep. 30, 1982

[87] PCT Pub. No.: WO84/00949
PCT Pub. Date: Mar. 15, 1984

Related U.S. Application Data

[63] Continuation of Ser. No. 451,656, Sep. 30, 1982, abandoned.

[51] Int. Cl.[4] ............................................. B64C 23/04
[52] U.S. Cl. .................... 244/198; 244/130; 244/200
[58] Field of Search ............. 244/35 A, 35 R, 198, 244/199, 200, 130, 54, 55

[56] References Cited

U.S. PATENT DOCUMENTS

| | | | |
|---|---|---|---|
| 2,739,770 | 3/1956 | Fanti et al. | 244/200 |
| 2,800,291 | 7/1957 | Stephens | 244/200 |
| 2,885,161 | 5/1959 | Kerker et al. | 244/198 |
| 2,967,030 | 1/1961 | Whitcomb . | |
| 2,990,142 | 6/1961 | Ferri . | |
| 2,997,256 | 8/1961 | Walker . | |
| 3,199,813 | 8/1965 | Roper . | |
| 3,270,990 | 9/1966 | Webb . | |
| 3,288,399 | 11/1966 | Gaster | 244/198 |
| 3,327,965 | 6/1967 | Bockrath | 244/54 |
| 3,370,810 | 2/1968 | Shevell et al. | 244/199 |
| 3,471,107 | 10/1969 | Ornberg . | |
| 3,744,745 | 7/1973 | Kerker et al. . | |
| 3,806,067 | 4/1974 | Kutney . | |
| 3,960,345 | 6/1976 | Lippert, Jr. . | |
| 4,243,188 | 1/1981 | DeBlois . | |
| 4,272,043 | 6/1981 | Spillman . | |
| 4,311,681 | 1/1982 | Finch . | |
| 4,314,681 | 2/1982 | Kutney | 244/200 |
| 4,334,658 | 6/1982 | Mackenzie | 244/198 |
| 4,354,648 | 10/1982 | Schenk et al. | 244/199 |

FOREIGN PATENT DOCUMENTS

| | | | |
|---|---|---|---|
| 595,877 | 4/1960 | Canada . | |
| 664288 | 1/1952 | United Kingdom | 244/130 |

Primary Examiner—Trygve M. Blix
Assistant Examiner—Rodney Corl
Attorney, Agent, or Firm—James P. Hamley; B. A. Donahue

[57] ABSTRACT

A wing-mounted pod for preventing an unstable increase in the pitching moment of a swept-wing aircraft due to increasing speed and angle of attack is disclosed. This invention is for use on a swept-wing aircraft of the type having a nonlinear, unstable increase in its pitching moment due to a loss of lift at the outboard wing above a predetermined angle of attack at high Mach numbers. For an aircraft having a single, strut-mounted engine on each wing, the pod is placed along the intersection of the upper surface of the wing and the inboard side of the engine mounting strut. The pod prevents an increase in the pitching moment by inducing the formation of a shock in the air flowing over the upper surface of the inboard wing at the same angle of attack at which the outboard wing loses lift. The shock causes localized flow separation on the inboard wing, thereby preventing the increase in pitching moment otherwise experienced by the aircraft.

15 Claims, 10 Drawing Figures

SHOCK INDUCING POD FOR CAUSING FLOW SEPARATION

This is a continuation of application Ser. No. 451,656, filed Sept. 30, 1982, now abandoned.

BACKGROUND OF THE INVENTION

This invention relates to correcting undesirable flight characteristics of an aircraft. More particularly, this invention relates to an aerodynamic device used to remedy a nonlinear, unstable high Mach number stall characteristic of a swept-wing jet transport commonly called "pitch up".

As known to those skilled in the art, air flowing over the upper surface of an airplane wing separates from the wing surface when the wing reaches a given angle of attack at sufficiently high airspeed, resulting in a loss of lift or a condition known as stall. Moreover, with a swept-wing airplane operating at high Mach numbers, e.g., above approximately 0.6, as the angle of attack of the wing is increased, air flowing over the upper surface of the outboard wing separates from the wing before air flowing over the upper surface of the inboard separates; thus, the outboard section of the wing effectively stalls at a lower angle of attack than the inboard section.

Two factors contribute to the earlier separation of airflow over the outboard wing. The first factor is spanwise airflow over the wing due to the sweep of the wing. The spanwise airflow augments the adverse pressure gradient experienced by air flowing over the outboard wing's upper surface, thereby contributing to earlier separation of airflow from the outboard wing's upper surface. A second factor causing earlier separation of airflow over the outboard wing is shock-induced separation. As air flowing over the outboard wing's upper surface reaches supersonic velocity, a shock is formed, and it is formed at lower airspeeds than on the inboard wing. The shock takes energy out of the airflow behind it, causing the airflow to tend to seperate from the wing's surface. Thus, as the angle of attack of a swept wing is increased when the airplane is operating at high Mach numbers, the outboard wing loses lift before the inboard wing.

On present-day swept-wing jet transports, the pitch axis of the airplane extends laterally through the center of gravity of the airplane and is generally located at approximately 25% of the mean aerodynamic chord of the wing. The centers of lift of the inboard and outboard wings are generally located rearward of the pitch axis; thus, the lifting forces generated by the inboard and outboard wings create a pitching moment that tends to force the nose of the airplane downwardly. In a stable flight condition, the pitching moment created by the lift of the wings is counteracted by a downward force exerted by the airplane's horizontal stabilizer. When the angle of attack of the wing is increased to the point where separation occurs on the outboard wing causing a decrease in the lift component, a resultant tendency toward pitch up occurs since the lift component of the inboard wing is still linearly increasing with increasing angle of attack and the downward force of the horizontal stabilizer increases proportionally with increasing inboard wing lift. The unstable character of this phenomenon is undesirable and is further aggravated by unpredictable factors such as local atmospheric conditions including local ambient wind patterns, e.g., gust upsets. Because of the abruptness of the effect at certain Mach numbers and the element of unpredictability, combined with the associated increase in load factor and the increase in buffet load at high Mach numbers and high angles of attack, various aerodynamic solutions to the problem have been proposed that are not dependent upon pilot response.

Two basic approaches have been used attempting to solve the high speed pitch up problem. In one approach, devices have been employed to enhance the outboard wing lifting capability. These include fences on the outboard wing or midwing, wing twist, profile camber changes, leading edge contour changes, wing planform changes (saw-tooth, gloves, etc.) and vortex generators located at the midspan of a wing. However, none of these have completely eliminated the pitch up problem. Most have increased the coefficient of outboard wing lift as a function of angle of attack but have not eliminated the pitch up loop nor changed its magnitude.

For example, midspan vortex generators provide a solution using this approach in that they were found to correct flow problems in the midspan area and prevent spanwise flow from affecting the outboard wing up to a certain angle of attack, thus helping airplane stability and extending the linear part of the pitching moment curve. However, this contribution to extension of the stable part of the pitching moment curve occurs at Mach numbers greater than the cruise Mach number of present day jet transports. In all cases, the solution with a vortex generator is likely to be very dependent upon the configuration of the wing, or local flow condition and shock position on the outboard wing. Thus, identical placement of voxtex generators on wings having different configurations are unlikely to achieve the same results.

The second basic approach used in attempting to solve the high speed pitch up problem is the reduction of inboard wing lift coincidentally with the loss of lift on the outboard wing. Efforts concentrating on this approach are relatively recent. One prior art device using this approach is an extendable/retractable discontinuity on the upper surface of the inboard wing and forward of the 25% chord. This discontinuity can be a stall strip or a leading edge spoiler progressivey extended with increasing Mach number and angle of attack. This type of device has been found to be effective in correcting high speed pitch up, however, it has several drawbacks. One is a sudden leading edge separation at high Mach numbers and angles of attack resulting in a very rapid rise in heavy tail buffet loading. Also, a pitching moment that is associated with the leading separation has been found to be undesirable from the standpoint of controlling the airplane. Additionally, since this device is a critical flight control component it must have a redundant mechanical system to ensure operability in the event of failure of the main system, thus resulting in an increase in mechanical complexity and weight. Further drawbacks include the necessity for its attachment to primary aircraft structure, anti-icing considerations, and increased drag.

Another prior art device following the second approach is a body vane that is positioned on the side of the fuselage close to the wing leading edge. Since a vane in this position is within an area of very high airflow speed relative to free stream velocity, the vane has to be aligned with the airflow during cruise in order to minimize its drag effect and also must be attached to primary aircraft structure due to the forces imposed upon it. Since the vane may require a different setting for climbout, it would require a drive mechanism to control the setting of the vane. Furthermore, establishing the correct aerodynamic position from wind tunnel testing is unlikely, and easy variation of position in flight may be difficult to attain because of the required support structure.

SUMMARY OF THE INVENTION

The present invention provides a highly effective solution to the pitch-up problem, largely without the attendant disadvantages of the prior art efforts described above. It comprises in essence an aerodynamic-type device requiring no moving parts and inherently compensates for the loss of lift of the outboard wing. Broadly viewed, such compensation is achieved by means aerodynamically inducing a shock over the inboard wing at the same airspeed and predetermined angle of attack as that causing the outboard wing loss of lift. The shock causes a localized separation of the air flowing over the upper surface of the inboard portion of the wing, thereby preventing the objectionable unstable pitching moment curve heretofore experienced.

For a swept-wing aircraft that has a strut-mounted engine on each wing, a preferred form of the invention is a protuberance or pod that is faired into the intersection of the upper surface of the wing and the inboard side of the strut. The pod, with its forward end located forwardly of the leading edge of the wing, extends rearwardly to a location adjacent the rear edge of the portion of the strut that lies above the upper surface of the wing. In this embodiment of the invention, the point of greatest curvature of the pod is positioned to form or intensify a shock that originates at the intersection of the leading edge of the wing and the inboard side of the engine mounting strut. An additional useful function of this shock forming pod in its preferred embodiment is provided by having the side of the pod that abuts the strut extend upwardly above the strut as a fence that acts as a vortex generator at angles of attack lower than the predetermined angle at which "pitch up" would occur. The resultant vortex action adds energy to air flowing over the strut and thereby decreases the drag of the pod and also minimizes the decrease in the maximum coefficient of lift of the aircraft wing.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
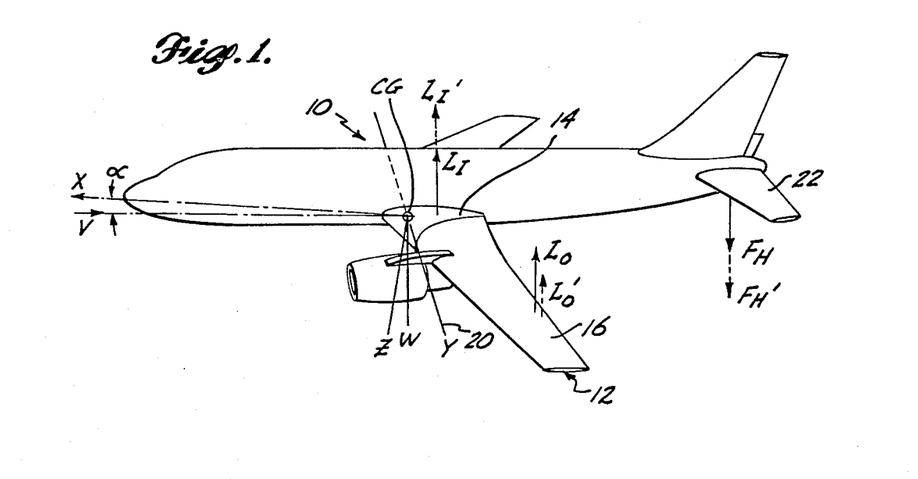
FIG. 1 is a perspective side view of an airplane showing the various force components operating on the lifting surfaces of the airplane.

FIG. 1 is a schematic drawing of a conventional aircraft 10 having swept wings 12. As an aid in understanding the following discussion, a Cartesian coordinate system having x, y, and z axes is shown with the origin of the coordinate system at the center of gravity (CG) of aircraft 10. The x-axis lies along the longitudinal axis of the aircraft 10; the y-axis extends laterally through the aircraft 10; and, the z-axis extends vertically through the aircraft 10. FIG. 1 also illustrates the direction and relative magnitude of force vectors acting on the aircraft 10 during a stable flight mode. Arrow W indicates the weight of the aircraft 10 acting through the center of gravity of the aircraft. The upwardly directed arrow $L_I$ represents lift generated by the inboard portion 14 of wing 12, and the upwardly directed arrow $L_O$ represents lift generated by the outboard portion 16 of the wing at a specific Mach number and a certain angle of attack of the aircraft 10. The angle of attack ($\alpha$) is the angle between a free-stream velocity vector V and the x-axis of the aircraft 10.

In a conventional swept-wing aircraft 10, the pitching axis 20 (herein the y-axis), i.e., the axis about which the aircraft will rotate to go into a nose-up or a nose-down condition, passes through the CG of the aircraft which varies in location from 10 to 35% of the mean aerodyanmic chord of wing 12. Since the centers of lift of inboard and outboard portions 14 and 16 of wing 12 typically combine to produce a nose-down pitching moment about pitch axis 20, a downward force, represented by arrow $F_H$, must be generated by the horizontal stabilizer 22 for the aircraft to maintain a stable flight condition.

Figure 2:
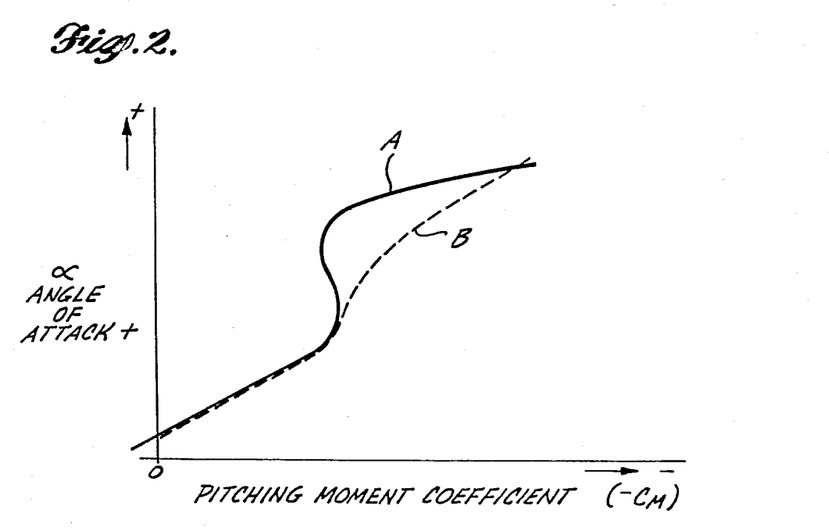
FIG. 2 is a graph showing the relationship between the angle of attack and the pitching moment of a wing.

As known to those skilled in the art, when the angle of attack ($\alpha$) of aircraft 10 is increased at high Mach numbers, i.e., above approximately 0.6, the lift component $L_O$ does not increase in the same fashion as $L_I$. The lift of the outboard wing 16 increases up to a threshold angle of attack and then begins to decrease, while the lift of the inboard wing 14 continues to increase. The downward force component $F_H$ also increases as the lift of the inboard wing 14 increases. Thus, above the threshold angle of attack, the inboard wing lift component has increased in magnitude (represented by dashed arrow $L'_I$), the outboard wing lift component has decreased in magnitude (represented by dashed arrow $L'_O$), and the downward force component at the horizontal stabilizer has increased in magnitude (represented by dashed arrow $F'_H$). After the threshold angle of attack has been passed, the summation of forces about pitch axis 20 results in an unstable increase in the pitching moment about the pitch axis, causing the aircraft to go into a nose-up attitude. This unstable increase in the pitching moment is called "pitch up". A graphical representation of the "pitch up" phenomenon is shown in FIG. 2 by curve A, wherein the pitching moment coefficient ($C_M$) is plotted as a function of the angle of attack ($\alpha$). The relationship between the pitching moment and pitching moment coefficient is expressed by the equation:

$$\text{pitching moment} = C_M q s \overline{C};$$

where
$C_M$=pitching moment coefficient;
$q = \frac{1}{2} \rho v^2$;
S=reference wing area
(vertical projection of the area bounded by the wing with the leading edge and trailing edge of the wing extended inwardly to the centerline of the fuselage); and,
$\overline{C}$=mean aerodyanmic chord.

Figure 3:
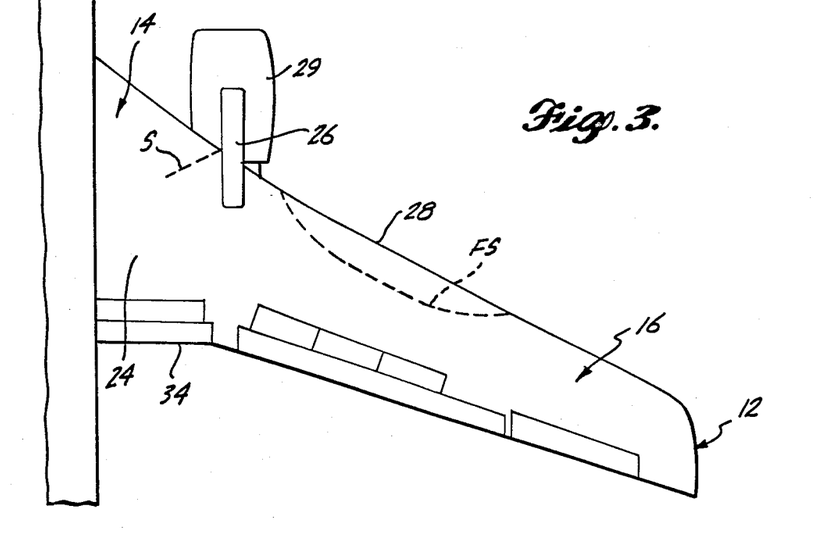
FIG. 3 is a plan view of an aircraft having a single strut-mounted jet engine suspended therefrom and showing the origination of a shock wave from the intersection of the strut and the leading edge of the wing.
Figure 4:
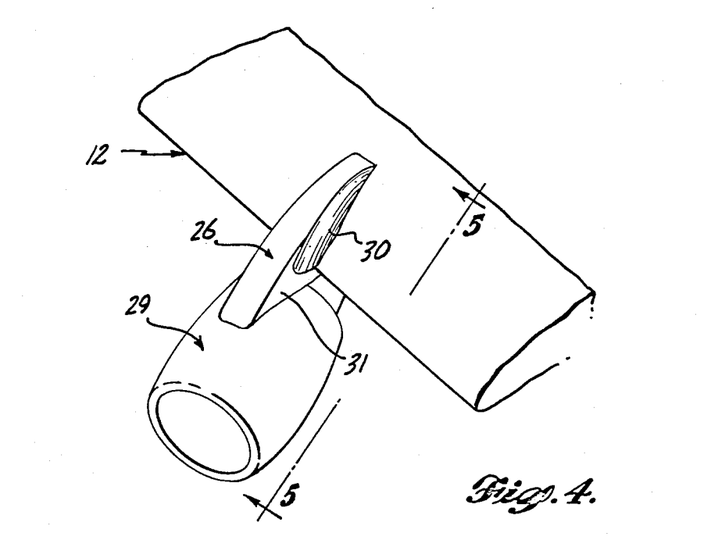
FIG. 4 is a perspective view of the pod mounted against the inboard side of an engine mounting strut.
Figure 5:
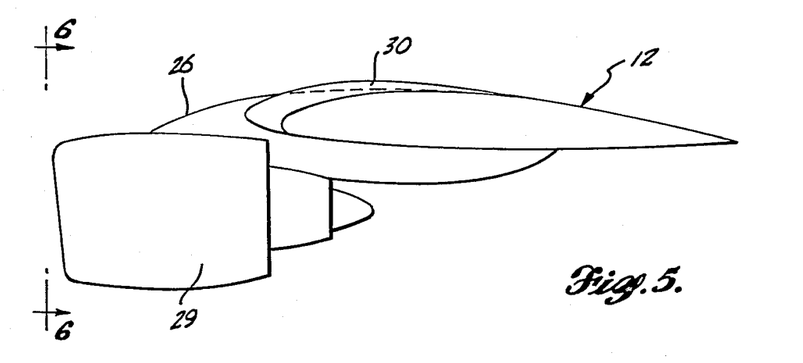
FIG. 5 is a side elevation view of the pod taken along viewing line 5—5 of FIG. 4.

The unstable pitch up condition occurs in curve A in the region where $C_M$ becomes more positive as $\alpha$ increases. The inventor has discovered that by forming a shock S, as depicted in FIG. 3, in the air flowing over upper surface 24 of inboard wing 14 at the same aircraft speed and angle of attack at which flow separation (represented by dashed line FS in FIG. 3) occurs for outboard wing 16, the $\alpha$ vs. $C_M$ relationship can be linearized as represented by curve B in FIG. 2, resulting in a stable pitching moment curve. The formation of shock S causes localized separation of air flowing over the upper surface 24 of inboard wing 14, resulting in a decrease in $L_I$ at the same time that $L_O$ decreases. The present invention uses the placement of a fixed protuberance at a predetermined location on an aircraft for formaton of shock S.

Figure 6:
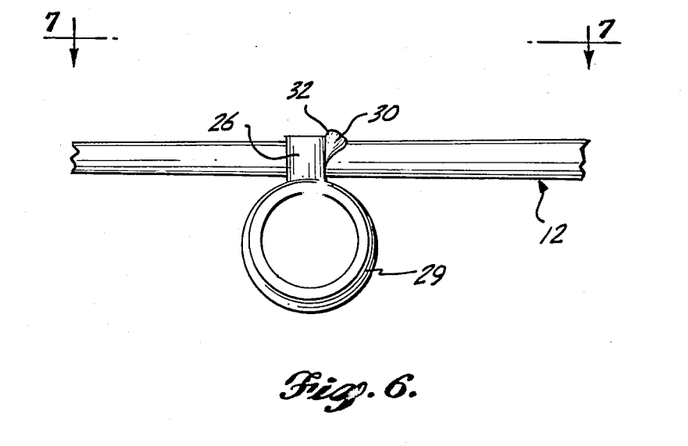
FIG. 6 is a front elevational view of the pod taken along viewing line 6—6 of FIG. 5.
Figure 7:
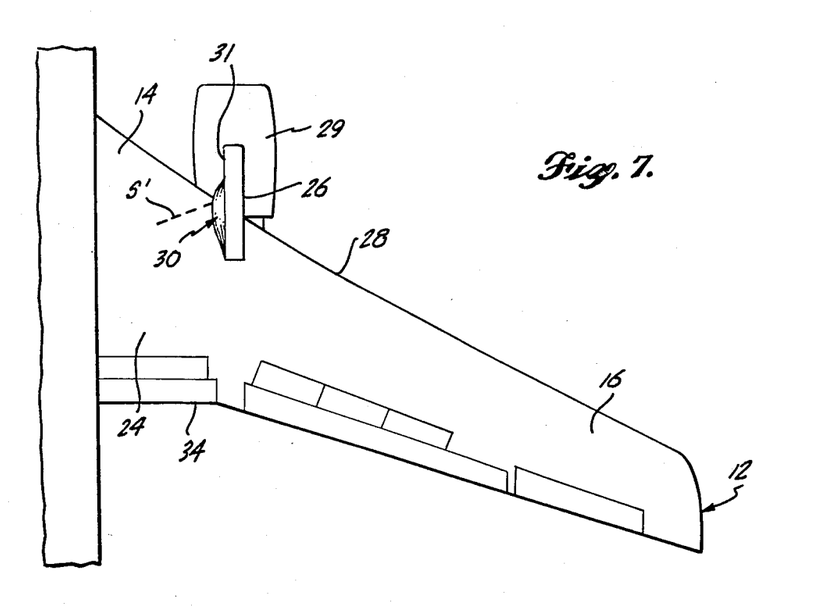
FIG. 7 is a plan view of the wing shown in FIG. 3 having a pod installed thereon.

For a swept-wing aircraft having a single jet engine 29 suspended from each wing 12 by a strut 26, a preferred embodiment of the present invention is comprised of a pod 30 that is faired into the inboard intersection of strut 26 and wing 12 (FIGS. 4 through 7). The pod is contoured to form a shock wave (s' in FIG. 7) that originates from the intersection of the leading edge 28 of wing 12 and the inboard side 31 of strut 26. As known to those skilled in the art, the final contour of pod 30 is established by a two-step process. The initial, general contour of pod 30 is generated by a computation process, while the precise, final contour of the pod is determined by physical modeling and wind tunnel testing. In this embodiment, pod 30 comprises an aerodynamically shaped protuberance tapered at its forward and aft ends (FIGS. 5 and 7) and having a cross section, taken along a lateral, vertical plane that approximates a quadrant of a circle. The forward end of pod 30 is located forward of leading edge 28, while the aft the of the pod terminates at a point adjacent a rear edge of the portion of strut 26 on the upper surface of wing 12 (FIG. 7).

As mentioned previously, pod 30 operates to decrease the pitching moment of an aircraft 10 by causing air flowing over inboard portion 14 of wing 12 to separate from the wing's upper surface as the angle attack of the wing is increased at high Mach numbers. The airflow separation associated with pod 30 originates at the trailing edge 34 of wing 12 (FIG. 7). The point of separation moves forward in the chordwise direction as the angle of attack of the wing or Mach number is increased. Since the separation of airflow from the upper surface of inboard portion 14 caused by pod 30 is a gradual process, an abrupt leading edge separation associated with prior devices is avoided so that greater control over the aircraft can be maintained.

Figure 8:
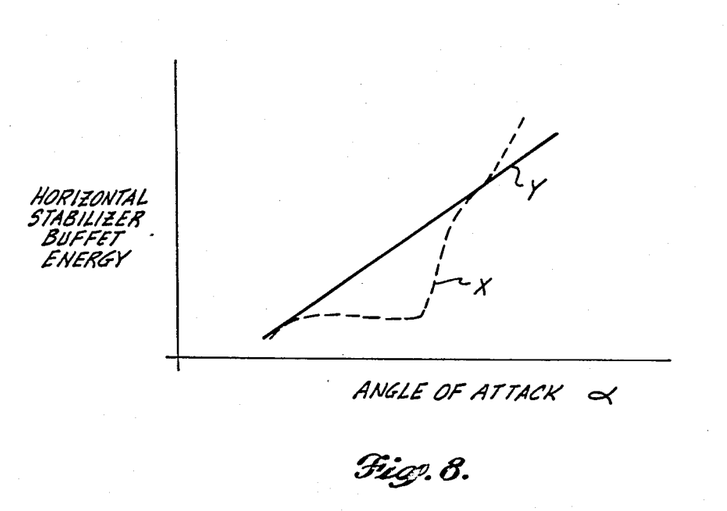
FIG. 8 is a graph showing the relationship between environment buffet energy level at horizontal stabilizer environment and angle of attack.

Another benefit is associated with the gradual flow separation caused by pod 30. Most of the high speed stall patterns associated with an inboard portion 14 of a wing 12 induce an abrupt increase in buffet energy on the horizontal stabilizer environment of the aircraft 10 due to the separated turbulent flow coming off the wing. The increase in buffet energy can be of a magnitude and/or frequency that imposes undesirable loads on the horizontal stabilizer structure or, in an extreme case, setting an angle of attack limit on the aircraft. The relationship between horizontal stabilizer environment buffet energy and angle of attack is illustrated in FIG. 8. The horizontal stabilizer environment buffet energy curve associated with a wing that does not use a pod 30 is represented by curve X. The buffet energy curve associated with a wing using a pod 30 is represented by curve Y. As shown in FIG. 8, the use of pod 30 changes the buffet energy spectrum in a favorable way. Because airflow separation over the inboard portion 14 of the wing 12 starts gradually at the trailing edge 34 of the wing and progresses forward as the angle of attack is increased, horizontal stabilizer environment buffet energy increases linearly with increasing angle of attack. If an angle of attack limit is set for the wing 12 to limit buffet energy to a specified level, the requirement of not exceeding the limit of the angle of attack can be met by precisely controlling the airplane angle of attack in a maneuver and going up the buffet energy slope until the angle of attack limit is reached. Such control is now possible because the $\alpha$ vs $C_M$ relationship is nearly linear with the use of pod 30.

As shown in FIG. 6, outboard side 32 of pod 30 that is in abutment with strut 26 extends upwardly beyond the upper surface of the strut. Outboard side 32 has a substantially planar, vertical configuration to make the upper, exposed portion of pod 30 act as a vortex generator for air flowing rearwardly over the upper surface of strut 26. In tests conducted by the inventor, when pod 30 is installed along the intersection of strut 26 and wing 12, the pod does not cause the amount of drag expected based upon its front and surface area. It is thought that the formation of a vortex by pod 30 decreases the effective drag caused by the pod. It has also been found that the presence of pod 30 has a minimal effect upon the maximum coefficient of lift ($C_{L\,max}$) of wing 12. The generation of a vortex by pod 30 is also thought to be the reason for this minimal effect on $C_{L\,max}$.

Figure 9:
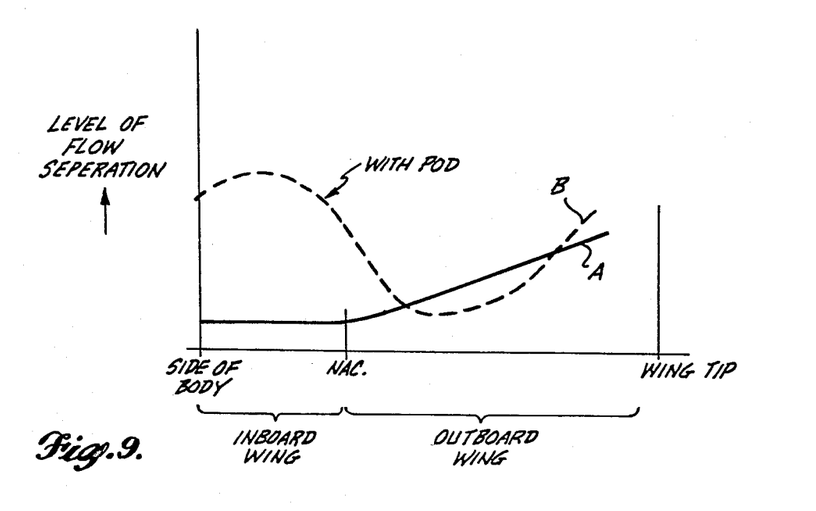
FIG. 9 is a graph plotting the level of flow separation at spanwise locations on a wing; and, FIG. 10 is a plan view of an aircraft wing having two strut-mounted jet engines suspended therefrom and showing alternative locations for the pods.

Another phenomenon observed for a wing 12 having an installed pod 30 is an interdependency between flow separation over the inboard and outboard wing 14 and 16. FIG. 9 shows a graph plotting the level of separation (established by measuring trailing edge pressures) at spanwise locations on a wing 12 for a specified Mach number and certain angle of attack. As illustrated by curve A (solid line), the level of separation for a wing 12 without pod 30 increases in the outboard direction past the engine nacelle. On a wing 12 with a pod 30 (curve B), the level of separation for the inboard wing 14 is greater than without the pod, as would be expected. However, on the outboard wing 16, the level of separation is lower than without the pod 30. Thus, an interdependency between flow separation on the inboard and outboard wings 14 and 16 appears to exist.

Figure 10:
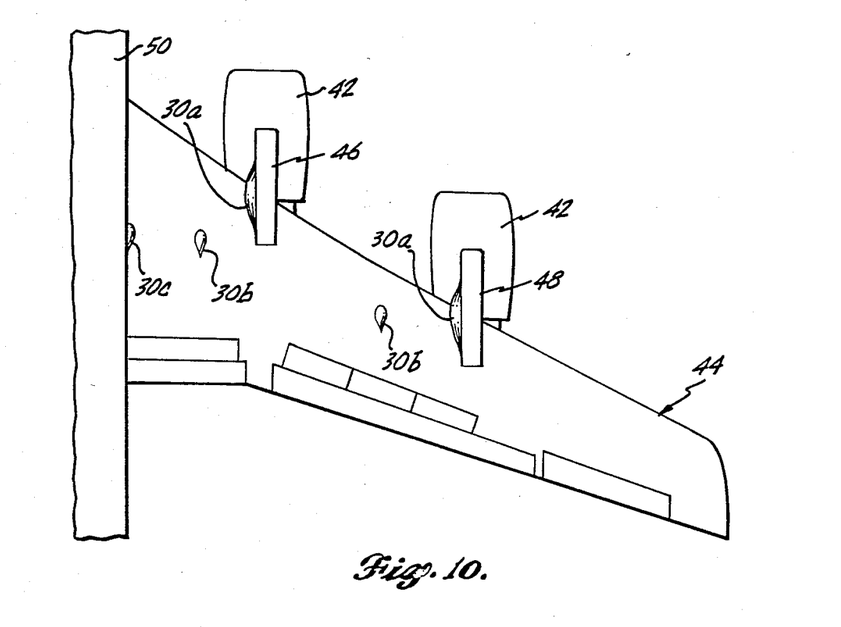

As shown in FIG. 10, another embodiment of the invention for a swept-wing aircraft having two engines 42 suspended from each wing 44 includes a pod located on the inboard side of the inboard nacelle strut 46 and another pod located on the inboard side of the outboard nacelle strut 48 as indicated by the reference numerals 30a. The size and contour of pods 30a are tailored to achieve the desired flow separation for the particular aerodynamic characteristic of the wing on which the pods are mounted. Another location for positioning pods on a wing 44 having two engines 42 is on the upper surface of the wing as noted by the pods having the reference numeral 30b. The pods located on the upper wing surface would have a tear-drop shape when viewed from above. The larger diameter end of the pod is oriented in the forward direction. In another embodiment of the invention, a pod 30c could be placed on the fuselage 50 of an aircraft at a position above the wing 44. Here again, the pod 30c would have a tear-drop shape when viewed in a horizontal direction. The function of these alternate embodiments is the same as the function of the preferred embodiemnt in that they are used to form a shock in the air flowing over the upper surface of the inboard portion of the wing 44 and thereby cause a localized separation of airflow on the upper surface.

In summary, the present invention has been described in relation to a preferred embodiment of the invention. It is to be understood that one of ordinary skill in the art could make various modifications, changes, substitutions of equivalents and other alterations to the invention as disclosed without departing from the original concept. It is therefore intended that the scope of Letters Patent granted hereon be limited only by the defining contained in the appended claims and equivalents thereof.

The embodiments of the invention in which an exclusive property or privilege is claimed are defined as follows:

1. In a swept-wing aircraft having a wing with inboard and outboard sections and a propulsion unit suspended intermediate the length of the wing by a supporting strut attached to the wing and extending chordwise thereof, said strut having an elongated upper portion with sides rising above the wing's upper surface and extending aft from the wing's leading edge with diminishing height above the wing to a rear terminus, means to reduce an abrupt, unstable pitching moment due to loss of outboard wing section lift occurring with increasing wing angle of attack above a predetermined value at a predetermined related airspeed, said airspeed above a Mach number of approximately 0.6, said means comprising an elongated pod extending chordwise as a protuberance from the wing's upper surface at a location alongside the strut's upper portion on the inboard side of said strut, said pod being configured to form a shock in the flow of air over the upper surface of the wing at said airspeed and angle of attack counteracting said loss of outboard wing section lift, thereby to reduce said unstable pitching moment change.

2. The apparatus defined in claim 1 wherein said pod protuberance is faired into said upper surface of the wing and into the adjacent side of the strut's upper portion along the length of the chordwise extending junction between them.

3. The apparatus defined in claims 1 or 2 wherein the pod projects forwardly from the leading edge of the wing and extends rearwardly therefrom to a terminus substantially at the rear terminus of said strut upper portion, said protuberance being contoured to form a shock originating at the intersection of the leading edge of the wing and the inboard side of said strut upper portion.

4. The apparatus defined in claims 1 or 2 wherein the pod projects forwardly from the leading edge of the wing and extends rearwardly therefrom to a terminus substantially at the rear terminus of said strut upper portion, said protuberance being contoured to form a shock originating substantially at the leading edge of the wing adjacent the inboard side of said strut upper portion, and further wherein the pod protuberance rises from the upper surface of the wing to a level above said strut upper portion so as to form a vortex generating fence which minimizes pod drag and further minimizes a decrease in coefficient of lift of the wing.

5. In a swept-wing aircraft having a wing with inboard and outboard sections and a propulsion unit suspended intermediate the length of the wing by a supporting strut attached to the wing and extending chordwise thereof, said strut having an elongated upper portion with sides rising above the wing's upper surface and extending aft from the wing's leading edge with diminishing height above the wing to a rear terminus, means to reduce an abrupt, unstable pitching moment change due to loss of outboard wing section lift occurring with increasing wing angle of attack above a predetermined value at a predetermined related airspeed, said means located along the line of intersection of the upper surface of said wing and the inboard side of said upper portion of said strut for forming a shock in the air flowing over the upper surface of the inboard section of said wing at said airspeed and angle of attack to cause localized flow separation on said inboard section, thereby reducing said unstable pitching moment change.

6. The apparatus defined in claim 5 wherein said shock forming means comprises a protuberance faired into said upper surface of the wing and into the adjacent side of the strut's upper portion along the length of the chordwise extending junction between them.

7. The apparatus defined in claims 5 or 6 wherein the protuberance projects forwardly from the leading edge of the wing and extends rearwardly therefrom to a terminus substantially at the rear terminus of said strut upper portion, said proturberance being contoured to form a shock originating at the intersection of the leading edge of the wing and the inboard side of said strut upper portion.

8. The apparatus defined in claims 5 or 6 wherein the protuberance projects forwardly from the leading edge of the wing and extends rearwardly therefrom to a terminus substantially at the rear terminus of said strut upper portion, said protuberance being contoured to form a shock originating substantially at the leading edge of the wing adjacent the inboard side of said strut upper portion, and further wherein the protuberance rises from the upper surface of the wing to a level above said strut upper portion so as to form a vortex generating fence that minimizes pod drag and further minimizes a decrease in the coefficient of lift of the wing.

9. In an aircraft of the type having a nonlinear, unstable increase in the pitching moment above a predetermined angle of attack for a predetermined aircraft speed, said aircraft having a wing with a leading edge and an upper surface, an improvement comprising:
    means located on said upper surface of said wing for forming a shock in the air flowing over the upper surface of said wing at said predetermined aircraft angle of attack of said wing and at an aircraft speed above a Mach number of approximately 0.6, said shock causing localized separation of the air flowing over said wing beginning at the trailing edge of said wing to prevent said increase in said pitching moment.

10. The apparatus of claim 9, wherein said shock forming means comprises a protuberance faired into said upper surface of said wing.

11. The apparatus of claim 10, wherein said protuberance has a tear-drop shape when viewed in planform, with the larger radius end of said tear-drop shape oriented toward said leading edge of said wing.

12. The apparatus of claim 11, wherein said protuberance is positioned rearward in the chordwise direction from said leading edge of said wing.

13. The apparatus of claim 12, wherein said protuberance is positioned between 10% and 40% of the chord of said wing.

14. In an aircraft of a type having an unstable increase in the pitching moment above a predetermined wing angle of attack for a predetermined aircraft speed, said aircraft having a fuselage and wings extending laterally from said fuselage, and said wings having an upper surface, an improvement comprising:

means located on said fuselage above said wings for forming a shock in the air flowing over the upper surface of said wings at said predetermined angle of attack of said wings and at an aircraft speed above a Mach number of approximately 0.6, said shock causing localized separation of the air flowing over said upper surface of said wings beginning at the trailing edge of said wings to prevent said increase in said pitching moment.

15. The apparatus of claim 14, wherein said shock forming means comprises a protuberance faired into the sides of said fuselage above said wings.

* * * * *